Patented May 16, 1950

2,507,830

UNITED STATES PATENT OFFICE 2,507,830

METHANE SULFONIC ACID SALT OF DI-HYDRO-ERGOTAMINE

Arthur Stoll and Albert Hofmann, Basel, Switzerland, assignors to Sandoz Limited, Basel, Switzerland, a Swiss firm No Drawing. Application June 5, 1946, Serial No. 674,636. In Switzerland April 20, 1940

1 Claim. (Cl. 260—285.5)

The present invention is a continuation-in-part of our co-pending patent application, Ser. No. 385,198, filed March 25, 1941, (now abandoned) which relates to sympatheticolytically active dihydro derivatives of lysergic acid amides.

The present invention more particularly relates to the preparation of water-soluble salts of dihydro-ergotamine.

Dihydro-ergotamine can be produced by treating ergotamine with hydrogen under pressure in the presence of a suitable catalyst and of a solvent, and in some cases at an elevated temperature, the method of production of dihydro-ergotamine being disclosed in our co-pending patent application, Ser. No. 385,198 (cf. Examples 1, 6 and 7 thereof).

The preparation of the new water-soluble salts of dihydro-ergotamine can be carried out by neutralizing a solution or a suspension of dihydro-ergotamine in a suitable solvent with the respective inorganic or organic acid. The salts thus obtained are generally beautifully crystallized compounds which are more or less soluble in water and are useful products for therapeutical purposes, the same being much better soluble in water than the dihydro-ergotamine itself.

The following examples, without being limitative, describe the present invention.

Example 1

0.735 part by weight (0.001 mol) of dihydro-ergotamine crystallisate from an acetone-water mixture and 0.075 part by weight (0.0005 mol) of d-tartaric acid are dissolved with heating in 20 parts by volume of methanol. On cooling down the neutral tartaric acid salt of dihydro-ergotamine crystallizes out in hexagonal plates, possessing the melting point of 210–215° C. (with decomposition). This salt possesses the formula $(C_{33}H_{37}O_5N_5)_2 \cdot C_4H_6O_6$ and gives on analysis after drying in high vacuo at 120° C. the following results:

Calculated for C, 63.80; H, 6.12; N, 10.64%. Found: 64.05, 6.02, 10.62%.

Example 2

1.3 parts by weight of dihydro-ergotamine crystallized from an acetone-water mixture are suspended in 25 parts of water and neutralized with 1.2 parts by volume of normal aqueous methane sulphonic acid. During the neutralisation the salt goes totally in solution. After having evaporated the solution to dryness in vacuo and dissolved the residue in 5 parts of 95% ethanol, the new salt, to which the appended claim is directed, crystallizes out in form of thick prisms possessing the melting point of 230–235° C. (with decomposition). The new salt possesses the formula $C_{33}H_{37}O_5N_5 \cdot CH_3SO_3H$ and gives on analysis after drying in high vacuo at 120° C. the following values:

Calculated for C, 60.05; H, 6.08; N, 10.31%. Found: 60.38, 6.17, 10.04%.

Example 3

In order to prepare the hydrochloride of dihydro-ergotamine one equivalent of dihydro-ergotamine is suspended in a small quantity of methanol and treated with one equivalent of a methanolic solution of hydrochloric acid. During this treatment the salt becomes first completely dissolved and begins to crystallize, after complete solution, in the form of white, fine needles of the melting point of 220–225° C. with decomposition.

What we claim is:

The water-soluble methane sulphonic acid salt of dihydro-ergotamine of the formula $C_{33}H_{37}O_5N_5 \cdot CH_3SO_3H$, which crystallizes from ethanol in thick prisms melting with decomposition at 230–235° C., which gives stable aqueous solutions and which possesses valuable therapeutical properties.

ARTHUR STOLL.
ALBERT HOFMANN.

REFERENCES CITED

The following references are of record in the file of this patent:

UNITED STATES PATENTS

| Number | Name | Date |
|---|---|---|
| 2,086,559 | Kharasch | July 13, 1937 |
| 2,086,562 | Kussner | July 13, 1937 |
| 2,156,242 | Kharasch et al. | Apr. 25, 1939 |